US012612933B2

(12) United States Patent (10) Patent No.: US 12,612,933 B2
Woodman et al. (45) Date of Patent: Apr. 28, 2026

(54) METHOD AND APPARATUS FOR ATTACHING A TRAMPOLINE MAT TO A TRAMPOLINE FRAME

(71) Applicant: PLUM PRODUCTS HOLDINGS PTY LTD, Neutral Bay (AU)

(72) Inventors: David Woodman, Ingham (GB); Luke Denby, Ingham (GB); Joseph Mazoyer, Lyons (FR); Philippe Bajard, Lyons (FR)

(73) Assignee: PLUM PRODUCTS HOLDINGS PTY LTD, Neutral Bay (AU)

( * ) Notice: Subject to any disclaimer, the term of this patent is extended or adjusted under 35 U.S.C. 154(b) by 94 days.

(21) Appl. No.: 18/794,946

(22) Filed: Aug. 5, 2024

(65) Prior Publication Data

US 2024/0392817 A1 Nov. 28, 2024

Related U.S. Application Data

(63) Continuation of application No. 17/777,592, filed as application No. PCT/GB2020/000093 on Nov. 18, 2020, now Pat. No. 12,078,198.

(30) Foreign Application Priority Data

Nov. 18, 2019 (GB) ..................................... 1916789

(51) Int. Cl.
*F16B 2/20* (2006.01)
*A63B 5/11* (2006.01)
(52) U.S. Cl.
CPC . *F16B 2/20* (2013.01); *A63B 5/11* (2013.01)

(58) Field of Classification Search
CPC ......... F16B 2/20; A63B 5/11; A63B 21/0552; A63B 21/0557; A63B 71/022
See application file for complete search history.

(56) References Cited

U.S. PATENT DOCUMENTS 6,543,094 B2 * 4/2003 D'Addario ............... H02G 3/26
24/459
9,289,637 B2 3/2016 Publicover et al.
(Continued)

FOREIGN PATENT DOCUMENTS

CN 201123975 10/2008
CN 207126015 U 3/2018
(Continued)

*Primary Examiner* — David M Upchurch
(74) *Attorney, Agent, or Firm* — Rabin & Berdo, P.C.

(57) ABSTRACT

A method for attaching a trampoline jumping mat to a trampoline frame using a plurality of clips and elastic connectors, each elastic connector having a first end that is a part of a loop, each clip having a handle connected to a hook, the handle having an aperture and a protrusion. The method includes, for each clip: passing the first end of an elastic connector through the aperture; attaching the hook to the trampoline frame; turning the first end to a first direction, so as to be guided around the hook, thereby changing to a second direction; passing the first end through an opening of the trampoline jumping mat, thereby changing back to the first direction; and pulling the first end over the protrusion, to be fastened to the protrusion. The first direction is from the handle to the hook, and is opposite to the second direction.

10 Claims, 6 Drawing Sheets

(56) References Cited

U.S. PATENT DOCUMENTS

| | | | |
|---|---|---|---|
| 10,532,238 B2 * | 1/2020 | Publicover | A63B 5/11 |
| 10,648,535 B2 * | 5/2020 | LeBeau | F16B 45/029 |
| 10,989,275 B2 * | 4/2021 | Mehr | A63B 5/11 |
| D920,458 S * | 5/2021 | Zeng | D21/797 |
| 11,167,165 B2 * | 11/2021 | Publicover | A63B 21/0557 |
| 2008/0016659 A1 | 1/2008 | Peterson | |
| 2013/0316876 A1 * | 11/2013 | Publicover | A63B 5/11 |
| | | | 482/27 |
| 2016/0310774 A1 * | 10/2016 | Publicover | A63B 5/11 |
| 2019/0143164 A1 * | 5/2019 | Bisang | F16B 45/012 |
| | | | 482/27 |
| 2019/0154115 A1 * | 5/2019 | Mehr | A63B 5/11 |
| 2020/0023224 A1 * | 1/2020 | Publicover | A63B 21/02 |
| 2020/0338380 A1 | 10/2020 | Chen | |

FOREIGN PATENT DOCUMENTS

| | | | |
|---|---|---|---|
| CN | 109432689 A | 3/2019 | |
| CN | 110787405 A | 2/2020 | |
| EP | 3246495 A1 | 11/2017 | |
| EP | 3466496 A1 | 4/2019 | |
| WO | 2008083614 A1 | 7/2008 | |
| WO | 2017191119 A1 | 11/2017 | |
| WO | 2018081836 A1 | 5/2018 | |

* cited by examiner

METHOD AND APPARATUS FOR ATTACHING A TRAMPOLINE MAT TO A TRAMPOLINE FRAME

This disclosure relates to apparatus for attaching a trampoline jumping mat to a trampoline frame, and a method for attaching a trampoline jumping mat to a trampoline frame.

Trampolines are a well known type of play apparatus that comprise a jumping mat attached to a trampoline frame with a biasing means that holds the jumping mat under tension. Historically, helical springs have been used, but recently some trampolines, in particular mini trampolines, have been provided with mats held under tension by other means such as one or more bungee cords. The trampoline industry has found that in some configurations bungee cords have advantages over trampolines with metal springs, helical springs, fibre rods or leaf springs. Additionally, although the toy safety standard EN71 does not distinguish between different types of springs vs elastic connectors such as bungee cords, some end users have a preference for bungee cords or elastic connectors over traditional springs. However, until now bungee cords, even individual bungee cords, are frustrating to use to assemble a trampoline, and in particular for larger trampolines, it is extremely difficult to obtain the required tension in the jumping mat.

Requiring each individual bungee cord to be knotted is fiddly, and it is at best extremely difficult for an adult to tie bungee cords when they are stretched to provide adequate tension for the jumping surface of the trampoline, even for mini trampolines of the "rebounder" category, which do not require as high a tension as larger trampolines. For larger trampolines, the difficulty increases.

The present disclosure results from Applicant's work seeking to provide improved apparatus for and methods for safely attaching a trampoline jumping mat to a trampoline frame in a manner that is both simple and safe for the person or persons assembling the trampoline, and for persons replacing parts or maintaining the trampoline, and which also results in an enjoyable jumping experience for persons jumping on the trampoline. In particular, this development is relevant to the use of elastic connectors such as bungee cords even in larger trampolines.

According to a first aspect of this disclosure, we provide a method for attaching a trampoline jumping mat to a trampoline frame using:

at least one clip comprising an aperture, the clip further comprising a hook for attaching the clip to the trampoline frame;

and at least one elastic connector comprising a length of elastic material with two ends;

the two ends being connected together so that the elastic material forms a loop capable of passing through the aperture in a clip with a portion comprising the ends of the material fastened together which portion cannot pass through the aperture;

the edge of the trampoline jumping mat being provided with a plurality of through openings;

the method comprising the steps of:

"a". passing the loop of the elastic connector through the aperture in the clip;

"b". attaching the clip to the frame using the hook;

"c". passing the loop of the elastic connector around both the hook and the frame;

"d". passing the loop through a through opening at the edge of the trampoline jumping mat; and "e". pulling the loop back to the clip and over a protrusion formed in the clip.

Preferably, step "a" is carried out before step "b", but alternatively step "b" could be carried out before step "a".

The elastic connector comprises a single loop of elastics material, including a knot or other suitable fastening which is incapable of passing through the aperture in the clip.

Preferably, the method is repeated with a plurality of clips and a plurality of elastic connectors.

According to a second aspect of this disclosure, there is provided a method for assembling a trampoline, the method comprising: attaching a trampoline jumping mat to a trampoline frame according to the aforesaid method.

According to a third aspect of this disclosure, there is provided a clip for attaching a trampoline jumping mat having an edge provided with a plurality of openings to a trampoline frame with the aid of an elastic connector formed into a loop by fastening its ends together, the clip comprising: an aperture sized to enable the loop but not its fastened ends to be passed through the aperture around the frame and through an opening at the jumping mat edge; and the clip further comprising a protrusion to which the loop can be fastened after passing around the frame and through an opening; the clip being characterised in that it further comprises a hook adapted to hook over a portion of the trampoline frame to thereby attach the clip to the trampoline frame, so that, in passing around the trampoline frame, the loop also passes around the hook.

Preferred embodiments of the above clip have one or more of the following features: The fastener is a protrusion around which a portion of an elastic connector can be looped. The clip is made from one or more of: nylon, acetal, polypropylene, high impact polystyrene, polyethylene (in particular low-density polyethylene (LDPE) or high-density polyethylene (HDPE)), or acrylonitrile butadiene styrene (ABS). Most preferably the clip is made from nylon. The clip is moulded, more preferably the clip is injection moulded. The clip is 3D printed. The hook of the clip comprises a groove for holding an elastic connector in a preferred position. The groove is positioned adjacent to the aperture. The groove comprises two or more sub-grooves, each sub-groove being arranged to hold a portion of an elastic connector in a preferred position. The clip is formed in one piece. The hook is shaped to cooperate with the frame of the trampoline.

According to a fourth aspect of this disclosure, there is provided a kit for attaching a trampoline jumping mat to a trampoline frame, the kit comprising one or more of the aforesaid clips, and an equal number of elastic connector(s) for use with the clip(s).

According to a fifth aspect of this disclosure, there is provided a trampoline assembled by use of the aforesaid clips and elastic connectors.

Preferred embodiments of apparatus for and methods for safely attaching a trampoline jumping mat to a trampoline frame in accordance with our teachings are described hereinbelow by way of example only with reference to the accompanying drawings in which.

Figure 1:
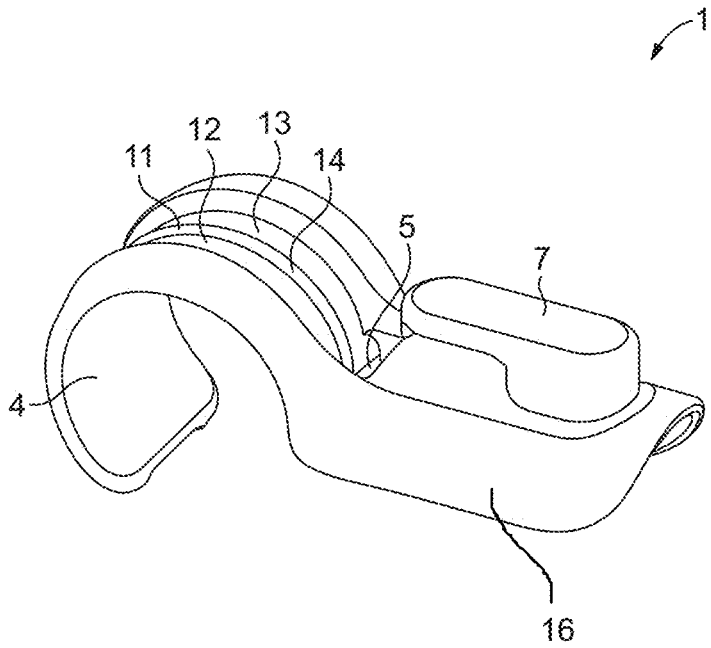
FIG. 1 is a perspective view of a clip for attaching a trampoline jumping mat to a trampoline frame.
Figure 2:
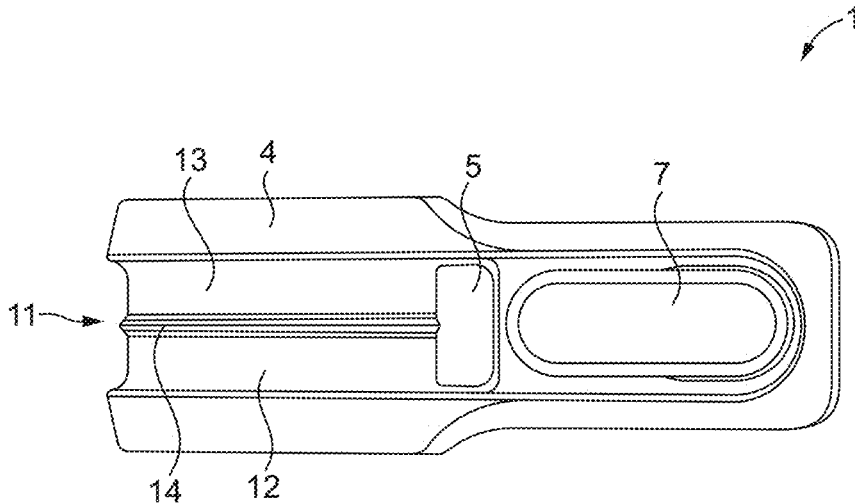
FIG. 2 is a top view of the clip of FIG. 1.
Figure 3:
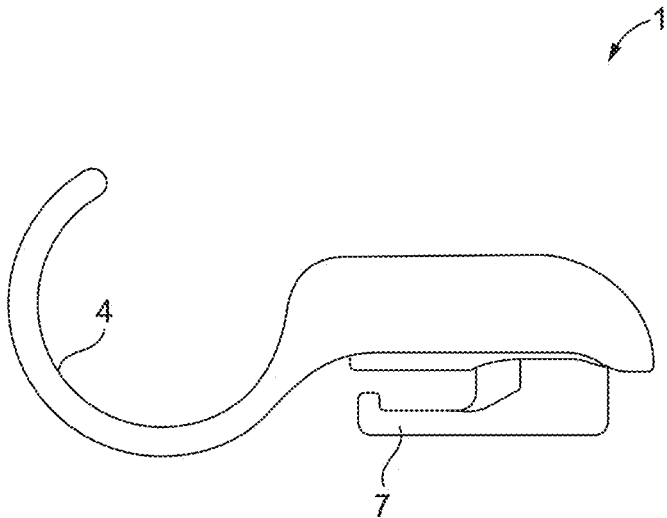
FIG. 3 is a side view of the clip of FIG. 1.

FIGS. 1-3 show a preferred embodiment of a clip 1 for attaching a trampoline jumping mat 2 to a trampoline frame 3. Clip 1 has a hook 4 for attaching clip 1 to a trampoline frame 3 according to the method depicted in FIGS. 4A-4E. Clip 1 also includes a handle 16 that has an aperture 5 which enables an elastic connector 6 to be passed through the aperture 5 and around both the hook 4 and the frame 3 of a trampoline. The handle 16 of the clip 1 further comprises a fastener 7 to which the elastic connector 6 can be fastened. As shown in the Figures, in the preferred embodiment of clip 1, fastener 7 is a protrusion around which a loop of elastic connector 6 can be looped.

Figure 4A:
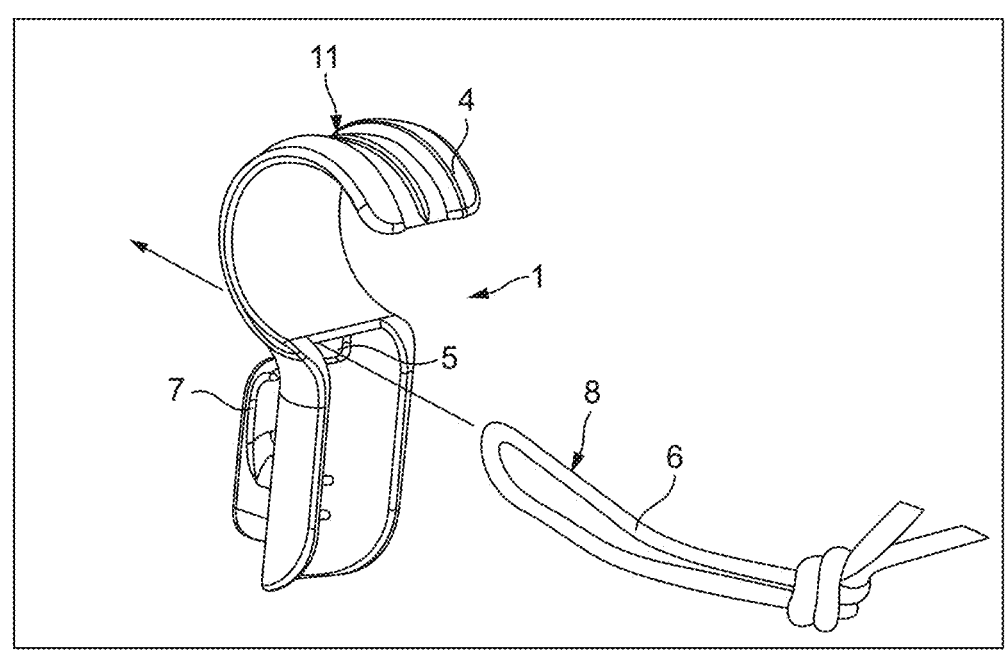
FIGS. 4A-4E illustrate successive steps in a method for attaching a trampoline jumping mat to a trampoline frame.

A preferred method for attaching a trampoline jumping mat to a trampoline frame is depicted in FIGS. 4a-4e, using a clip 1 comprising an aperture 5, the clip 1 further comprising a hook 4 for attaching the clip 1 to the trampoline frame 3; and an elastic connector 6, which in Applicant's preferred embodiment is a bungee cord, comprising a first portion 8 and a second portion 9, the first portion 8 comprising a loop. FIG. 4a depicts the method step of passing part of the elastic connector 6 through the aperture 5 in the clip 1. The method step of attaching the clip 1 to the frame 3 using the hook 4 is not shown, but it will be appreciated that hook 4 can simply be hooked over frame 3 either before or after part of the elastic connector is passed through aperture 5.

Figure 4B:
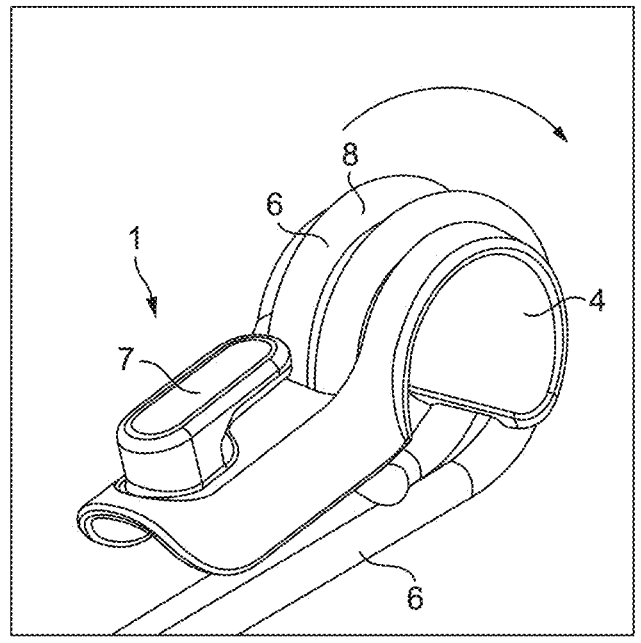
Figure 4C:
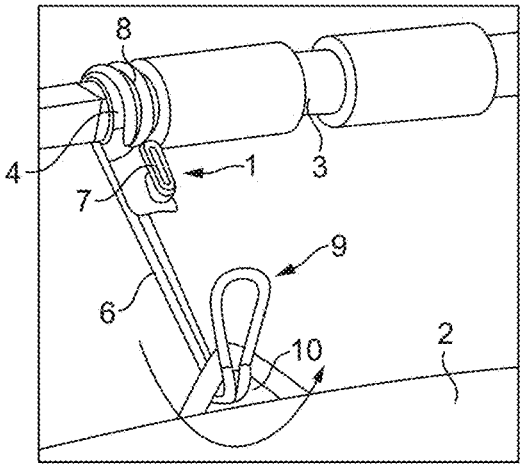
Figure 4D:
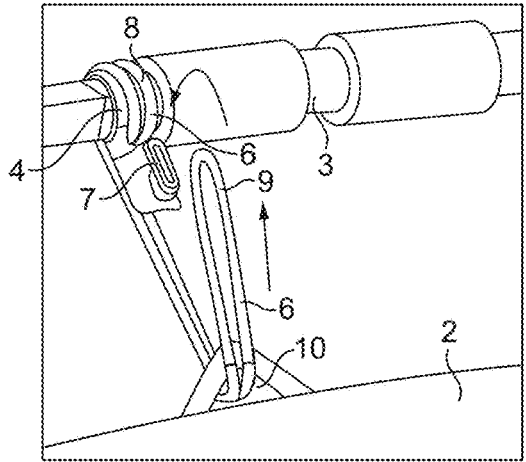
Figure 4E:
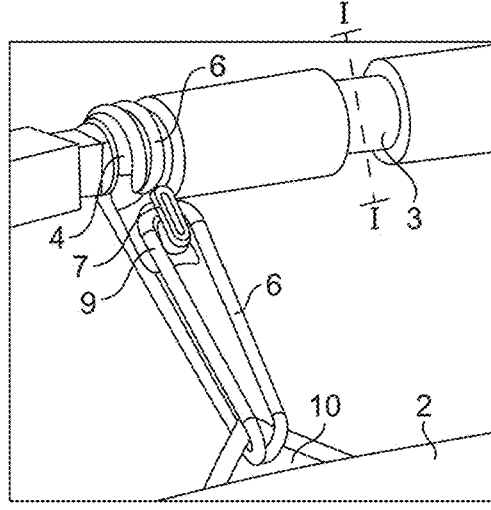

The trampoline frame partially shown in FIGS. 4c-e has a generally circular cross section as shown at section I-I, and hook 4 is shaped to accommodate part of frame 3. It is generally preferred that trampolines have a circular cross section for their frames, but where a clip is required to attach a jumping mat to the frame of a trampoline with a frame having a cross section other than circular, the shape of the hook could be adjusted to co-operate with the shape of the frame. "Co-operate" does not mean that the general shape of the hook has to match the cross section of the frame, it only needs to be functionally compatible with the frame with which it is intended to be used.

FIG. 4b shows the immediate result of method step "c", the trampoline frame being omitted from the view for clarity. First portion 8 of elastic connector 6 has been passed around both hook 4 and frame 3. The second portion 9 of elastic connector 6 is then connected to the trampoline jumping mat 2, as shown in FIGS. 4c-4e. In this preferred embodiment, the trampoline mat comprises an opening 10, and connection to the jumping mat 2 is achieved by passing the second portion 9 of the elastic connector 6 through the opening 10 in the trampoline jumping mat 2, and attaching the second portion 9 of the elastic connector to the clip 1 by looping second portion 9 around a protrusion which is a fastener 7.

The elastic connector comprises a single loop of elastics material, optionally including a knot or other suitable fastening which cannot pass through aperture 5, in which one part of the single loop is considered to be the first portion and another part of the single loop is considered to be the second portion, as shown in the figures. One particular benefit of this is that the knot can be positioned within the clip, reducing access to the knot, which provides benefits both to user safety and to the appearance of the trampoline.

Clip 1 in Applicants' preferred embodiment is made from nylon, but alternative materials, including but not limited to: acetal, polypropylene, high impact polystyrene, polyethylene (in particular low-density polyethylene (LDPE) or high-density polyethylene (HDPE)), or acrylonitrile butadiene styrene (ABS) would also be suitable. Clip 1 in Applicants' preferred embodiment is injection moulded, but other manufacturing methods would be suitable, including 3D printing. Clip 1 in Applicants' preferred embodiment has a groove 11 which helps to keep elastic connector 6 in the desired position, and prevent elastic connector 6 slipping off the hook 4. Groove 11 extends from a position adjacent to aperture 5. As the part of elastic connector 6 that is passed around the hook 4 of clip 1 has two bungee strands, in the preferred embodiment, groove 11 has two sub-grooves 12 and 13 to each receive one bungee strand in their preferred positions. Sub-grooves 12 and 13 are separated by a raised portion 14.

The above description relates to a single point of attachment of a jumping mat of a trampoline to the frame of a trampoline. It will be preferable to have a plurality of points of attachment between the mat and the frame. Most preferably, each of the plurality of points of attachment is made by using a clip and a connector as described herein. Alternatively, where a plurality of points of attachment are desired between a jumping mat of and a frame of a trampoline, some but not all of the connections can be provided according to the method described herein or using clips as described herein. By way of non-limiting example, this could be the case when users want to replace a single connection on their trampoline without replacing other connections, or when there are two or more categories of connection between the jumping mat and the trampoline frame. For example, in a trampoline that requires connections both around the circumference of the jumping mat and also at points not on the circumference of the mat, different attachment means could be used to fulfil the different requirements of those different locations. For example, the present arrangement could preferentially be used in areas where children could accidentally come into contact with the connectors, and springs or bungees attached in an alternative manner could be used in areas where users, in particular children, would not be likely to come into contact with the connectors.

An advantage of providing clip(s) separately from both the mat and the frame is that this allows for individual parts to be replaced without requiring replacement of other parts. Additionally, Applicants' method of attaching a jumping mat to a frame allows an end user to attach the mat by pulling on a soft elastic connector, rather than pulling on the clip itself, as in previously proposed trampolines. Requiring an assembler to pull on the clip itself can result in assemblers getting their fingers trapped between the clip and the frame, or even in a clip being projected by the elastic if user error occurs. As Applicants' clip is safely hooked to the frame before the user has to stretch the elastic connector to connect the mat to the frame in steps "d" and "e", there is no risk of the clip coming free and potentially injuring an assembler during assembly of the trampoline.

Figure 5:
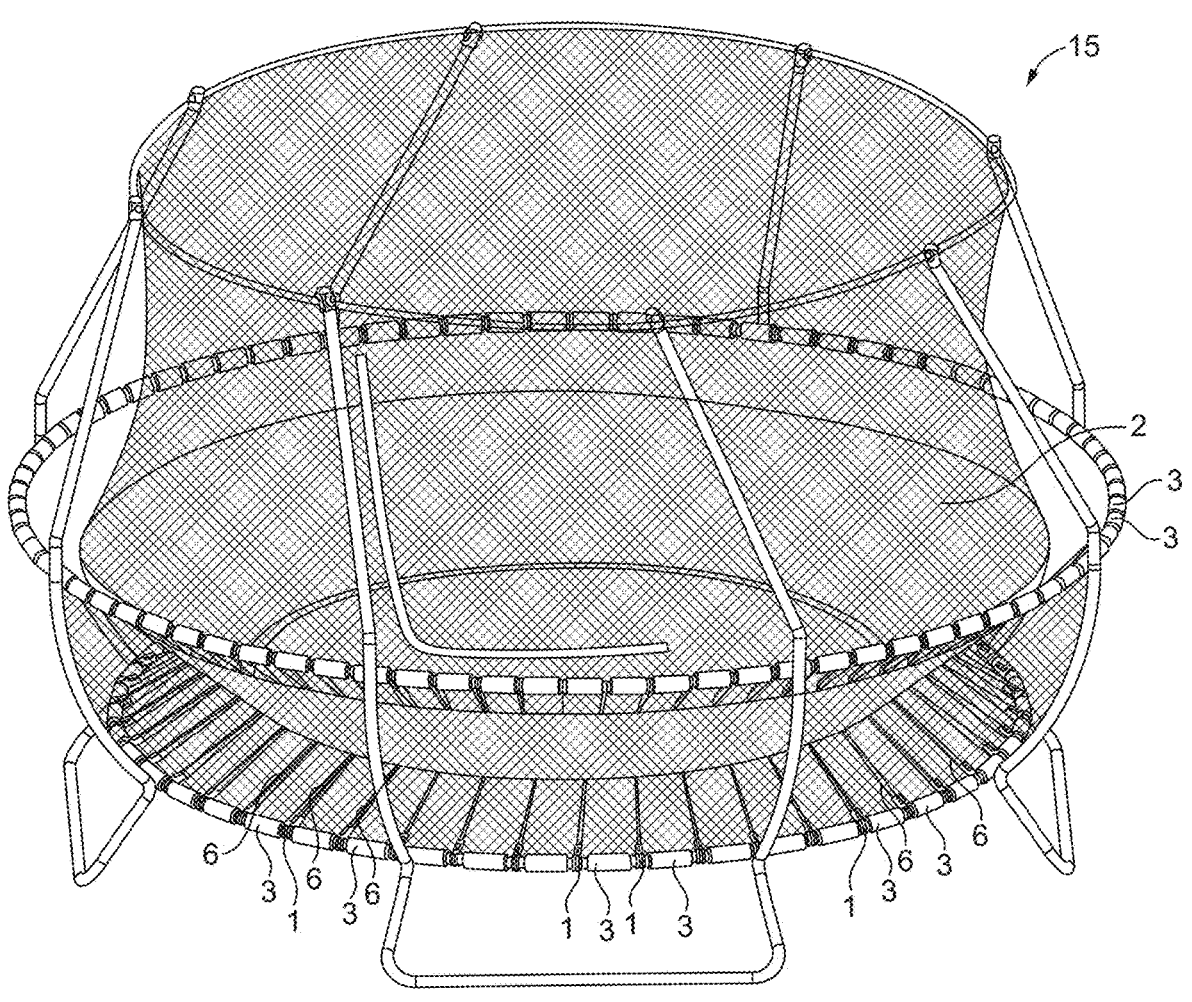
FIG. 5 shows a trampoline with a plurality of clips.

FIG. 5 shows a trampoline 15 that has its jumping mat 2 connected to its frame 3 by a plurality of clips 1 and elastic connectors 6. Although the trampoline shown in FIG. 5 has a generally circular footprint, together with a frustoconical mat and two rows of elastic connectors, it will be understood that clips according to the present invention, and a method for attaching a jumping mat to a trampoline frame according to the present invention can be used with trampolines of other shaped footprints, including but not limited to: square, oval, rectangular, etc., and with planar or non-planar jumping mats, and with any number of clips and connectors.

The invention claimed is:

1. A method for attaching a trampoline jumping mat to a trampoline frame using a plurality of clips and a plurality of elastic connectors corresponding thereto, the trampoline jumping mat having, on an edge thereof, a plurality of openings, which are connectable to the trampoline frame by the plurality of clips and the plurality of elastic connectors, respectively, each of the elastic connectors having a first end that is a part of a loop, and a second end that is larger in size than the first end, each clip having:

a hook shaped to be attachable to a part of the trampoline frame, and having an outer surface configured to guide the first end of a corresponding one of the elastic connectors to pass around the hook, and a handle connected to the hook, the handle having an aperture sized to allow the first end but not the second end of the corresponding elastic connector to pass therethrough, and a protrusion to which the first end of the corresponding elastic connector is fastenable, the method comprising, for each of the clips:

passing the first end of the corresponding elastic connector through the aperture in said each clip;

attaching the hook of said each clip to the trampoline frame;

turning the first end of the corresponding elastic connector to a first direction, such that the first end is then guided around the hook and the part of the trampoline frame to which the hook is attached, thereby changing a direction of the first end to a second direction;

passing the first end of the corresponding elastic connector through the corresponding one of the plurality of openings at the edge of the trampoline jumping mat, thereby changing the direction of the first end back to the first direction; and pulling the first end of the corresponding elastic connector over the protrusion of said each clip, and fastening the first end to the protrusion, wherein the first direction is a direction from the handle to the hook, and the second direction is opposite to the first direction.

2. The method according to claim 1, wherein the hook is attached to the trampoline frame before the first end is passed through the aperture.

3. A method for assembling a trampoline, the method comprising: attaching a trampoline jumping mat to a trampoline frame according to the method according to claim 1.

4. A clip for attaching a trampoline jumping mat to a trampoline frame, the trampoline jumping mat having, on an edge thereof, a plurality of openings, each of which is connectable to the trampoline frame by the clip using an elastic connector, the elastic connector having a first end that is a part of a loop, and a second end that is larger in size than the first end, the clip comprising:

a hook shaped to be attachable to a part of the trampoline frame, and having an outer surface configured to guide the first end of the elastic connector to pass around the hook; and a handle connected to the hook, the handle having an aperture sized to allow the first end but not the second end of the elastic connector to pass therethrough, and a protrusion to which the first end of the elastic connector is fastenable, wherein the protrusion is so shaped that the first end of the elastic connector, after passing through the aperture, turning to a first direction to be guided around the hook and the part of the trampoline frame that the hook is attached to, subsequently to a second direction, and then passing through said each opening of the trampoline jumping mat, and turning again to the first direction, is fastenable to the protrusion, and the first direction is a direction from the handle to the hook, and the second direction is opposite to the first direction.

5. The clip according to claim 4, wherein the outer surface of the hook has a groove for accommodating the elastic connector passing around the hook.

6. The clip according to claim 5, wherein the groove terminates adjacent to the aperture.

7. The clip according to claim 5, wherein the groove comprises two parallel sub-grooves, arranged to accommodate two parallel parts of the loop of the elastic connector.

8. A kit for attaching a trampoline jumping mat to a trampoline frame, the kit comprising at least one clip according to claim 4, and at least one elastic connector having a first end that is a part of a loop, and a second end that is larger in size than the first end, the at least one elastic connector being equal in number to the at least one clip.

9. A trampoline comprising:

a frame, a jumping mat having an edge provided with a plurality of openings, a plurality of clips according to claim 4, and a plurality of elastic connectors each having a first end that is a part of a loop, and a second end that is larger in size than the first end, the plurality of elastic connectors being equal in number to the plurality of clips.

10. The clip according to claim 4, wherein the second end of the elastic connector has a knot formed by tying the elastic connector.

* * * * *